United States Patent Office 2,938,911
Patented May 31, 1960

2,938,911

CONDENSATION PRODUCTS OF SUGAR ACID LACTONES WITH AROMATIC HYDROCARBONS

Carl B. Linn, Riverside, Ill., assignor, by mesne assignments, to Universal Oil Products Company, Des Plaines, Ill., a corporation of Delaware No Drawing. Filed May 9, 1957, Ser. No. 658,002

13 Claims. (Cl. 260—343.6)

This application is a continuation-in-part of my copending application Serial No. 450,222, filed August 16, 1954, now abandoned.

This invention relates to a new and useful process for condensing sugar acid lactones with aromatic hydrocarbons in the presence of a Friedel-Crafts metal halide catalyst and to the products or novel compositions of matter formed by said condensation. The organic products formed by my condensation of sugar acid lactones with aromatic hydrocarbons are useful per se, and are also useful as intermediates in the manufacture of detergents, pharmaceuticals, surface coatings, resins, gelling agents, corrosion inhibitors, and the like.

For example, the lactone of 1,1-di-phenyl-1-desoxy-glucuronic acid, formed by the condensation of glucuronolactone with benzene, can be converted to a so-called sugar detergent by ester exchange with methyl laurate, methyl myristate, methyl palmitate, methyl oleate, or methyl stearate. These ester exchange reactions, as described in Industrial & Engineering Chemistry 48, 1459–1464 (1956), are preferably carried out in dimethylformamide solution utilizing potassium carbonate or sodium methoxide as the catalyst. As is observable from this publication, the preparation of detergents from sugar derivatives may be carried out readily by one skilled in the art.

More specifically, this invention relates to a process for producing aryl-substituted polyhydroxycarboxylic acids, and salts and lactones thereof. These lactones are internal esters of said polyhydroxycarboxylic acids, formed by the loss of water by interaction of a hydroxyl group with the carboxylic acid group of a given molecule of a polyhydroxycarboxylic acid, with the resultant formation of furanose or pyranose ring systems or lactones.

An object of this invention is to condense an aromatic hydrocarbon with a lactone of a sugar acid in the presence of a Friedel-Crafts metal halide catalyst, and to recover the products of said condensation.

Another object of this invention is to condense an aromatic hydrocarbon with glucuronolactone, and to recover the product of said condensation.

A still further object of this invention is to condense benzene with glucuronolactone and to recover the product of said condensation.

One embodiment of this invention relates to a process which comprises condensing an aromatic hydrocarbon with a lactone of a sugar acid in the presence of a Friedel-Crafts metal halide catalyst, and recovering the resultant condensation product.

Another embodiment of this invention relates to a process which comprises condensing an aromatic hydrocarbon with a lactone of a sugar acid in the presence of an aluminum chloride catalyst and recovering the resultant condensation product.

Still another embodiment of this invention relates to a process which comprises condensing benzene with glucuronolactone in the presence of an aluminum chloride catalyst and recovering the resultant condensation product.

A still further embodiment of this invention is a product produced by condensing benzene with glucuronolactone in the presence of aluminum chloride.

A still further embodiment of this invention is a member of the group consisting of an aryl-1-desoxy-aldurono-lactone, an aryl-1-desoxy-alduronic acid, and a sodium salt of an aryl-1-desoxy-alduronic acid.

I have found that useful water-soluble and water-insoluble condensation products are formed by reacting lactones of sugar acids with aromatic hydrocarbons in the presence of Friedel-Crafts metal halide catalysts, and particularly in the presence of aluminum chloride. These condensation reaction are carried out conveniently in ordinary glass alkylation equipment using temperatures of from about $-20°$ C. to about $150°$ C., and preferably at temperatures of from about $20°$ C. to about $100°$ C. While many of the condensation reactions are carried out at substantially atmospheric pressure, it may be desirable in certain instances and with certain reactants to carry out the reaction in metal autoclaves at pressures up to 100 atmospheres or more. It is convenient in most instances to operate the equipment utilized at the pressure generated by the reaction mixture and catalyst contained therein at the temperature utilized.

Aromatic hydrocarbons suitable for use as starting materials in the process of this invention include compounds containing only carbon and hydrogen and in which there is retained at least one hydrogen atom attached to a carbon atom of the aromatic nucleus. Thus compounds such as hexamethylbenzene are excluded from the scope of the process of the present invention since such compounds are inoperative. The aromatic hydrocarbons include those substituted with alkyl, aralkyl, aryl, alkaryl, cycloalkyl, alkylcycloalkyl, etc., radicals containing only carbon and hydrogen. Some aromatic hydrocarbons may contain olefinic unsaturation or double bonds in the side chains or substituent groups containing only carbon and hydrogen and such compounds are within the generally broad scope of the present invention, but, however, such compounds are not preferred. Thus, the preferred aromatic hydrocarbons are unsubstituted aromatic hydrocarbons, and aromatic hydrocarbons containing saturated or aromatic substituents containing only carbon and hydrogen. Aromatic hydrocarbons utilizable within the broad scope of the process of the present invention include benzene, toluene, ortho-xylene, meta-xylene, 1,2,3-trimethylbenzene, 1,2,4-trimethylbenzene, 1,3,5-trimethylbenzene, 1,2,3.4-tetramethylbenzene, 1,2,3,5-tetramethylbenzene, 1,2,4,5-tetramethylbenzene, pentamethylbenzene, ethylbenzene ortho-ethyltoluene, meta-ethyltoluene, para-ethyltoluene, n-propylbenzene, isopropylbenzene, n-butylbenzene, isobutylbenzene, sec-butylbenzene, tert-butylbenzene, amylbenzenes, para-cymene, and higher molecular weight alkylaromatic hydrocarbons. Alkylaromatic hydrocarbons with long chain alkyl groups utilizable in the process may be produced by the alkylation of aromatic hydrocarbons with olefin polymers to yield such materials as hexylbenzenes, hexyltoluenes, nonylbenzenes, nonyltoluenes, dodecylbenzenes, dodecyltoluenes, etc. Often alkylate is obtained as a high boiling fraction in which case the alkyl group attached to the aromatic hydrocarbon may contain from about 6 to about 24 carbon atoms.

Other aromatic hydrocarbons suitable for conversion into arylated derivatives of lactones of sugar acids include those with two or more aryl groups such as diphenyl, diphenyl methane, triphenyl methane, etc. Examples of suitable utilizable aromatic hydrocarbons which contain condensed benzene rings include naphthalene, alpha-methylnaphthalene, beta-methylnaphthalene, phenanthrene, anthracene, naphthacene, pyrene, chrysine, rubrene, etc. Examples of other aromatic hydrocarbons utilizable in the process of the present invention include indan, fluorene, cyclopentylbenzene, methylcyclopentylbenzene, cyclohexylbenzene, etc.

The sugar acid lactones which are utilizable as starting materials in the process of the present invention include both the alpha and beta forms of lyxuronolactone, arabinuronolactone, riburonolactone, taluronolactone, galacturonolactone, iduronolactone, guluronolactone, mannuronolactone, glucuronolactone, altruronolactone, alluronolactone, etc. These internal esters of alduronic acids are spontaneously formed upon heating suitable alduronic acids in which formation of a 1-4 or gamma-lactone structure is possible, or in which formation of a 1-5 or delta-lactone structure is possible. The alduronic acids are a group of compounds which are obtainable by oxidation of the terminal alcohol group of aldoses. The penturonic acids and their conversion to penturonolactones can be represented by the following general equation:

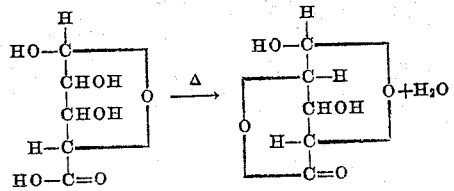

The hexuronic acids and their conversion to hexuronolactones can be represented by the following general equation:

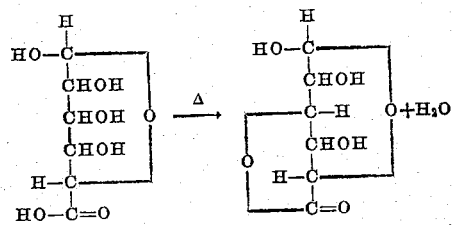

Since the alduronic acids must contain at least 5 carbon atoms to be able to form gamma-lactones, the sugar acid lactones which are preferred as starting materials in the process of this invention will contain at least 5 carbon atoms. Also utilizable are sugar acid lactones containing 6 carbon atoms and more. When the sugar acid lactones react with aromatic hydrocarbons to form the new compositions of matter of the present invention, they do so by reaction at the number 1 carbon atom, thus forming aryl derivatives of lactones of 1-desoxy-uronic acids.

As an example of this process, glucuronolactone may be reacted with an equimolecular proportion or less of benzene to give mono-phenyl-desoxy-glucuronic acid lactone or with more than an equimolecular proportion of benzene to give the lactone of di-phenyl-desoxy-glucuronic acid. The structures of some of these aryl hexuronic acid lactone reaction products are represented as follows:

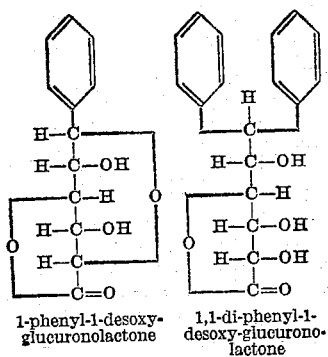

1-phenyl-1-desoxy-glucuronolactone 1,1-di-phenyl-1-desoxy-glucuronolactone

An example of my di-aryl-hexuronic acid products is 1,1-di-phenyl-1-desoxy-glucuronic acid represented by the following structural formula:

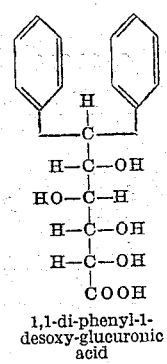

1,1-di-phenyl-1-desoxy-glucuronic acid

Typical novel compositions of matter or new compounds which are prepared in accordance with the process of the present invention include 1-phenyl-1-desoxy-lyxuronolactone,
1,1-di-phenyl-1-desoxy-lyxuronolactone,
1-phenyl-1-desoxy-xyluronolactone,
1,1-di-phenyl-1-desoxy-xyluronolactone,
1-phenyl-1-desoxy-arabinuronolactone,
1,1-di-phenyl-1-desoxy-arabinuronolactone,
1-phenyl-1-desoxy-riburonolactone,
1,1-di-phenyl-1-desoxy-riburonolactone,
1-phenyl-1-desoxy-taluronolactone,
1,1-di-phenyl-1-desoxy-taluronolactone,
1-phenyl-1-desoxy-galacturonolactone,
1,1-di-phenyl-1-desoxy-galacturonolactone,
1-phenyl-1-desoxy-iduronolactone,
1,1-di-phenyl-1-desoxy-iduronolactone,
1-phenyl-1-desoxy-guluronolactone,
1,1-di-phenyl-1-desoxy-guluronolactone,
1-phenyl-1-desoxy-mannuronolactone,
1,1-di-phenyl-1-desoxy-mannuronolactone,
1-phenyl-1-desoxy-glucuronolactone,
1,1-di-phenyl-1-desoxy-glucuronolactone,
1,1-di-phenyl-1-desoxy-altruronolactone,
1,1-di-phenyl-1-desoxy-altruronolactone,
1-phenyl-1-desoxy-alluronolactone,
1,1-di-phenyl-1-desoxy-alluronolactone,
1-p-tolyl-1-desoxy-lyxuronolactone,
1,1-di-(p-tolyl)-1-desoxy-lyxuronolactone,
1-p-tolyl-1-desoxy-xyluronolactone,
1,1-di-(p-tolyl)-1-desoxy-xyluronolactone,
1-p-tolyl-1-desoxy-arabinuronolactone,
1,1-di-(p-tolyl)-1-desoxy-arabinuronolactone,
1-p-tolyl-1-desoxy-riburonolactone,
1,1-di-(p-tolyl)-1-desoxy-riburonolactone,
1-p-tolyl-1-desoxy-taluronolactone,
1,1-di-(p-tolyl)-1-desoxy-taluronolactone,
1-p-tolyl-1-desoxygalacturonolactone,
1,1-di-(p-tolyl)-1-desoxy-galacturonolactone,
1-p-tolyl-1-desoxy-iduronolactone,
1,1-di-(p-tolyl)-1-desoxy-iduronolactone,
1-p-tolyl-1-desoxy-guluronolactone,
1,1-di-(p-tolyl)-1-desoxy-guluronolactone,
1-p-tolyl-1-desoxy-mannuronolactone,
1,1-di-(p-tolyl)-1-desoxy-mannuronolactone,
1-p-tolyl-1-desoxy-glucuronolactone,
1,1-di-(p-tolyl)-1-desoxy-glucuronolactone,
1-p-tolyl-1-desoxy-altruronolactone,
1,1-di-(p-tolyl)-1-desoxy-altruronolactone,
1-p-tolyl-1-desoxy-alluronolactone,
1,1-di-(p-tolyl)-1-desoxy-alluronolactone,
1-(3,4-dimethylphenyl)-1-desoxy-lyxuronolactone,
1,1-di-(3,4-dimethylphenyl)-1-desoxy-lyxuronolactone,
1-(3,4-dimethylphenyl)-1-desoxy-xyluronolactone,
1,1-di-(3,4-dimethylphenyl)-1-desoxy-xyluronolactone,
1-(3,4-dimethylphenyl)-1-desoxy-arabinuronolactone, 1,1-di-(3,4-dimethylphenyl)-1-desoxy-arabinuronolactone,
1-(3,4-dimethylphenyl)-1-desoxy-riburonolactone,
1,1-di-(3,4-dimethylphenyl)-1-desoxy-riburonolactone,
1-(3,4-dimethylphenyl)-1-desoxy-taluronolactone,
1,1-di-(3,4-dimethylphenyl)-1-desoxy-taluronolactone,
1-(3,4-dimethylphenyl)-1-desoxy-galacturonolactone,
1,1-di-(3,4-dimethylphenyl)-1-desoxy-galacturonolactone,
1-(3,4-dimethylphenyl)-1-desoxy-iduronolactone,
1,1-di-(3,4-dimethylphenyl)-1-desoxy-iduronolactone,
1-(3,4-dimethylphenyl)-1-desoxy-guluronolactone,
1,1-di-(3,4-dimethylphenyl)-1-desoxy-guluronolactone,
1-(3,4-dimethylphenyl)-1-desoxy-mannuronolactone,
1,1-di-(3,4-dimethylphenyl)-1-desoxy-mannuronolactone,
1-(3,4-dimethylphenyl)-1-desoxy-glucuronolactone,
1,1-di-(3,4-dimethylphenyl)-1-desoxy-glucuronolactone,
1-(3,4-dimethylphenyl)-1-desoxy-altruronolactone,
1,1-di-(3,4-dimethylphenyl)-1-desoxy-altruronolactone,
1-(3,4-dimethylphenyl)-1-desoxy-alluronolactone,
1,1-di-(3,4-dimethylphenyl)-1-desoxy-alluronolactone,
1-p-ethylphenyl-1-desoxy-lyxuronolactone,
1,1-di-(p-ethylphenyl)-1-desoxy-lyxuronolactone,
1-p-ethylphenyl-1-desoxy-xyluronolactone,
1,1-di-(p-ethylphenyl)-1-desoxy-xyluronolactone,
1-p-ethylphenyl-1-desoxy-arabinuronolactone,
1,1-di-(p-ethylphenyl)-1-desoxy-arabinuronolactone,
1-p-ethylphenyl-1-desoxy-riburonolactone,
1,1-di-(p-ethylphenyl)-1-desoxy-riburonolactone,
1-p-ethylphenyl-1-desoxy-taluronolactone,
1,1-di-(p-ethylphenyl)-1-desoxy-taluronolactone,
1-p-ethylphenyl-1-desoxy-galacturonolactone,
1,1-di-(p-ethylphenyl)-1-desoxy-galacturonolactone,
1-p-ethylphenyl-1-desoxy-iduronolactone,
1,1-di-(p-ethylphenyl)-1-desoxy-iduronolactone,
1-p-ethylphenyl-1-desoxy-guluronolactone,
1,1-di-(p-ethylphenyl)-1-desoxy-guluronolactone,
1-p-ethylphenyl-1-desoxy-mannuronolactone,
1,1-di-(p-ethylphenyl)-1-desoxy-mannuronolactone,
1-p-ethylphenyl-1-desoxy-glucuronolactone,
1,1-di-(p-ethylphenyl)-1-desoxy-glucuronolactone,
1-p-ethylphenyl-1-desoxy-altruronolactone,
1,1-di-(p-ethylphenyl)-1-desoxy-altruronolactone,
1-p-ethylphenyl-1-desoxy-alluronolactone,
1,1-di-(p-ethylphenyl)-1-desoxy-alluronolactone,
1-phenyl-1-desoxy-lyxuronic acid,
1,1-di-phenyl-1-desoxy-lyxuronic acid,
1-phenyl-1-desoxy-xyluronic acid,
1,1-di-phenyl-1-desoxy-xyluronic acid,
1-phenyl-1-desoxy-arabinuronic acid,
1,1-di-phenyl-1-desoxy-arabinuronic acid,
1-phenyl-1-desoxy-riburonic acid,
1,1-di-phenyl-1-desoxy-riburonic acid,
1-phenyl-1-desoxy-taluronic acid,
1,1-di-phenyl-1-desoxy-taluronic acid,
1-phenyl-1-desoxy-galacturonic acid,
1,1-di-phenyl-1-desoxy-galacturonic acid,
1-phenyl-1-desoxy-iduronic acid,
1,1-di-phenyl-1-desoxy-iduronic acid,
1-phenyl-1-desoxy-guluronic acid,
1,1-di-phenyl-1-desoxy-guluronic acid,
1-phenyl-1-desoxy-mannuronic acid,
1-phenyl-1-desoxy-mannuronic acid,
1-phenyl-1-desoxy-glucuronic acid,
1,1-di-phenyl-1-desoxy-glucuronic acid,
1-phenyl-1-desoxy-altruronic acid,
1,1-di-phenyl-1-desoxy-altruronic acid,
1-phenyl-1-desoxy-alluronic acid,
1,1-di-phenyl-1-desoxy-alluronic acid,
1-p-tolyl-1-desoxy-lyxuronic acid,
1,1-di-(p-tolyl)-1-desoxy-lyxuronic acid,
1-p-tolyl-1-desoxy-xyluronic acid,
1,1-di-(p-tolyl)-1-desoxy-xyluronic acid,
1-p-tolyl-1-desoxy-arabinuronic acid,
1,1-di-(p-tolyl)-1-desoxy-arabinuronic acid, 1-p-tolyl-1-desoxy-riburonic acid,
1,1-di-(p-tolyl)-1-desoxy-riburonic acid,
1-p-tolyl-1-desoxy-taluronic acid,
1,1-di-(p-tolyl)-1-desoxy-taluronic acid,
1-p-tolyl-1-desoxy-galacturonic acid,
1,1-di-(p-tolyl)-1-desoxy-galacturonic acid,
1-p-tolyl-1-desoxy-iduronic acid,
1,1-di-(p-tolyl)-1-desoxy-iduronic acid,
1-p-tolyl-1-desoxy-guluronic acid,
1,1-di-(p-tolyl)-1-desoxy-guluronic acid,
1-p-tolyl-1-desoxy-mannuronic acid,
1,1-di-(p-tolyl)-1-desoxy-mannuronic acid,
1-p-tolyl-1-desoxy-glucuronic acid,
1,1-di-(p-tolyl)-1-desoxy-glucuronic acid,
1-p-tolyl-1-desoxy-altruronic acid,
1,1-di-(p-tolyl)-1-desoxy-altruonic acid,
1-p-tolyl-1-desoxy-alluronic acid,
1,1-di-(p-tolyl)-1-desoxy-alluronic acid,
1-(3,4-dimethylphenyl)-1-desoxy-lyxuronic acid,
1,1-di-(3,4-dimethylphenyl)-1-desoxy-lyxuronic acid,
1-(3,4-dimethylphenyl)-1-desoxy-xyluronic acid,
1,1-di-(3,4-dimethylphenyl)-1-desoxy-xyluronic acid,
1-(3,4-dimethylphenyl)-1-desoxy-arabinuronic acid,
1,1-di-(3,4-dimethylphenyl)-1-desoxy-arabinuronic acid,
1-(3,4-dimethylphenyl)-1-desoxy-riburonic acid,
1,1-di-(3,4-dimethylphenyl)-1-desoxy-riburonic acid,
1-(3,4-dimethylphenyl)-1-desoxy-taluronic acid,
1,1-di-(3,4-dimethylphenyl)-1-desoxy-taluronic acid,
1-(3,4-dimethylphenyl)-1-desoxy-galacturonic acid,
1,1-di-(3,4-dimethylphenyl)-1-desoxy-galacturonic acid,
1-(3,4-dimethylphenyl)-1-desoxy-iduronic acid,
1,1-di-(3,4-dimethylphenyl)-1-desoxy-iduronic acid,
1-(3,4-dimethylphenyl)-1-desoxy-guluronic acid,
1,1-di-(3,4-dimethylphenyl)-1-desoxy-guluronic acid,
1-(3,4-dimethylphenyl)-1-desoxy-mannuronic acid,
1,1-di-(3,4-dimethylphenyl)-1-desoxy-mannuronic acid,
1-(3,4-dimethylphenyl)-1-desoxy-glucuronic acid,
1,1-di-(3,4-dimethylphenyl)-1-desoxy-glucuronic acid,
1-(3,4-dimethylphenyl)-1-desoxy-altruronic acid,
1,1-di-(3,4-dimethylphenyl)-1-desoxy-altruronic acid,
1-(3,4-dimethylphenyl)-1-desoxy-alluronic acid,
1,1-di-(3,4-dimethylphenyl)-1-desoxy-alluronic acid,
1-p-ethylphenyl-1-desoxy-lyxuronic acid,
1,1-di-(p-ethylphenyl)-1-desoxylyxuronic acid,
1-p-ethylphenyl-1-desoxy-xyluronic acid,
1,1-di-(p-ethylphenyl)-1-desoxy-xyluronic acid,
1-p-ethylphenyl-1-desoxy-arabinuronic acid,
1,1-di-(p-ethylphenyl)-1-desoxy-arabinuronic acid,
1-p-ethylphenyl-1-desoxy-riburonic acid,
1,1-di-(p-ethylphenyl)-1-desoxy-riburonic acid,
1-p-ethylphenyl-1-desoxy-taluronic acid,
1,1-di-(p-ethylphenyl)-1-desoxy-taluronic acid,
1-p-ethylphenyl-1-desoxy-galacturonic acid,
1,1-di-(p-ethylphenyl)-1-desoxy-galacturonic acid,
1-p-ethylphenyl-1-desoxy-iduronic acid,
1,1-di-(p-ethylphenyl)-1-desoxy-iduronic acid,
1-p-ethylphenyl-1-desoxy-guluronic acid,
1,1-di-(p-ethylphenyl)-1-desoxy-guluronic acid,
1-p-ethylphenyl-1-desoxy-mannuronic acid,
1,1-di-(p-ethylphenyl)-1-desoxy-mannuronic acid,
1-p-ethylphenyl-1-desoxy-glucuronic acid,
1,1-di-(p-ethylphenyl)-1-desoxy-glucuronic acid,
1-p-ethylphenyl-1-desoxy-altruonic acid,
1,1-di-(p-ethylphenyl)-1-desoxy-altruronic acid,
1-p-ethylphenyl-1-desoxy-alluronic acid,
1,1-di-(p-ethylphenyl)-1-desoxy-alluronic acid,
the sodium salt of 1-phenyl-1-desoxy-lyxuronic acid,
the sodium salt of 1,1-di-phenyl-1-desoxy-lyxuronic acid,
the sodium salt of 1-phenyl-1-desoxy-xyluronic acid,
the sodium salt of 1,1-di-phenyl-1-desoxy-xyluronic acid,
the sodium salt of 1-phenyl-1-desoxy-arabinuronic acid,
the sodium salt of 1,1-di-phenyl-1-desoxy-arabinuronic acid,
the sodium salt of 1-phenyl-1-desoxy-riburonic acid,
the sodium salt of 1,1-di-phenyl-1-desoxy-riburonic acid, the sodium salt of 1-phenyl-1-desoxy-taluronic acid,
the sodium salt of 1,1-di-phenyl-1-desoxy-taluronic acid,
the sodium salt of 1-phenyl-1-desoxy-galacturonic acid,
the sodium salt of 1,1-di-phenyl-1-desoxy-galacturonic acid,
the sodium salt of 1-phenyl-1-desoxy-iduronic acid,
the sodium salt of 1,1-di-phenyl-1-desoxy-iduronic acid,
the sodium salt of 1-phenyl-1-desoxy-guluronic acid,
the sodium salt of 1,1-di-phenyl-1-desoxy-guluronic acid,
the sodium salt of 1-phenyl-1-desoxy-mannuronic acid,
the sodium salt of 1,1-di-phenyl-1-desoxy-mannuronic acid,
the sodium salt of 1-phenyl-1-desoxy-glucuronic acid,
the sodium salt of 1,1-di-phenyl-1-desoxy-glucuronic acid,
the sodium salt of 1-phenyl-1-desoxy-altruronic acid,
the sodium salt of 1,1-di-phenyl-1-desoxy-altruronic acid,
the sodium salt of 1-phenyl-1-desoxy-alluronic acid,
the sodium salt of 1,1-di-phenyl-1-desoxy-alluronic acid,
the sodium salt of 1-p-tolyl-1-desoxy-lyxuronic acid,
the sodium salt of 1,1-di-(p-tolyl)-1-desoxy-lyxuronic acid,
the sodium salt of 1-p-tolyl-1-desoxy-xyluronic acid,
the sodium salt of 1,1-di-(p-tolyl)-1-desoxy-xyluronic acid,
the sodium salt of 1-p-tolyl-1-desoxy-arabinuronic acid,
the sodium salt of 1,1-di-(p-tolyl)-1-desoxy-arabinuronic acid,
the sodium salt of 1-p-tolyl-1-desoxy-riburonic acid,
the sodium salt of 1,1-di-(p-tolyl)-1-desoxy-riburonic acid,
the sodium salt of 1-p-tolyl-1-desoxy-taluronic acid,
the sodium salt of 1,1-di-(p-tolyl)-1-desoxy-taluronic acid,
the sodium salt of 1-p-tolyl-1-desoxy-galacturonic acid,
the sodium salt of 1,1-di-(p-tolyl)-1-desoxy-galacturonic acid,
the sodium salt of 1-p-tolyl-1-desoxy-iduronic acid,
the sodium salt of 1,1-di-(p-tolyl)-1-desoxy-iduronic acid,
the sodium salt of 1-p-tolyl-1-desoxy-guluronic acid,
the sodium salt of 1,1-di-(p-tolyl)-1-desoxy-guluronic acid,
the sodium salt of 1-p-tolyl-1-desoxy-mannuronic acid,
the sodium salt of 1,1-di-(p-tolyl)-1-desoxy-mannuronic acid,
the sodium salt of 1-p-tolyl-1-desoxy-glucuronic acid,
the sodium salt of 1,1-di-(p-tolyl)-1-desoxy-glucuronic acid,
the sodium salt of 1-p-tolyl-1-desoxy-altruronic acid,
the sodium salt of 1,1-di-(p-tolyl)-1-desoxy-altruronic acid,
the sodium salt of 1-p-tolyl-1-desoxy-alluronic acid,
the sodium salt of 1,1-di-(p-tolyl)-1-desoxy-alluronic acid,
the sodium salt of 1-(3,4-dimethylphenyl)-1-desoxy-lyxuronic acid,
the sodium salt of 1,1-di-(3,4-dimethylphenyl)-1-desoxy-lyxuronic acid,
the sodium salt of 1-(3,4-dimethylphenyl)-1-desoxy-xyluronic acid,
the sodium salt of 1,1-di-(3,4-dimethylphenyl)-1-desoxy-xyluronic acid,
the sodium salt of 1-(3,4-dimethylphenyl)-1-desoxy-arabinuronic acid,
the sodium salt of 1,1-di-(3,4-dimethylphenyl)-1-desoxy-arabinuronic acid,
the sodium salt of 1-(3,4-dimethylphenyl)-1-desoxy-riburonic acid,
the sodium salt of 1,1-di-(3,4-dimethylphenyl)-1-desoxy-riburonic acid,
the sodium salt of 1-(3,4-dimethylphenyl)-1-desoxy-taluronic acid,
the sodium salt of 1,1-di-(3,4-dimethylphenyl)-1-desoxy-taluronic acid,
the sodium salt of 1-(3,4-dimethylphenyl)-1-desoxy-galacturonic acid,
the sodium salt of 1,1-di-(3,4-dimethylphenyl)-1-desoxy-galacturonic acid,
the sodium salt of 1-(3,4-dimethylphenyl)-1-desoxy-iduronic acid,
the sodium salt of 1,1-di-(3,4-dimethylphenyl)-1-desoxy-iduronic acid,
the sodium salt of 1-(3,4-dimethylphenyl)-1-desoxy-guluronic acid,
the sodium salt of 1,1-di-(3,4-dimethylphenyl)-1-desoxy-guluronic acid,
the sodium salt of 1-(3,4-dimethylphenyl)-1-desoxy-mannuronic acid,
the sodium salt of 1,1-di-(3,4-dimethylphenyl)-1-desoxy-mannuronic acid,
the sodium salt of 1-(3,4-dimethylphenyl)-1-desoxy-glucuronic acid,
the sodium salt of 1,1-di-(3,4-dimethylphenyl)-1-desoxy-glucuronic acid,
the sodium salt of 1-(3,4-dimethylphenyl)-1-desoxy-altruronic acid,
the sodium salt of 1,1-di-(3,4-dimethylphenyl)-1-desoxy-altruronic acid,
the sodium salt of 1-(3,4-dimethylphenyl)-1-desoxy-alluronic acid,
the sodium salt of 1,1-di-(3,4-dimethylphenyl)-1-desoxy-alluronic acid,
the sodium salt of 1-p-ethylphenyl-1-desoxy-lyxuronic acid,
the sodium salt of 1,1-di-(p-ethylphenyl)-1-desoxy-lyxuronic acid,
the sodium salt of 1-p-ethylphenyl-1-desoxy-xyluronic acid,
the sodium salt of 1,1-di-(p-ethylphenyl)-1-desoxy-xyluronic acid,
the sodium salt of 1-p-ethylphenyl-1-desoxy-arabinuronic acid,
the sodium salt of 1,1-di-(p-ethylphenyl)-1-desoxy-arabinuronic acid,
the sodium salt of 1-p-ethyl-phenyl-1-desoxy-riburonic acid,
the sodium salt of 1,1-di-(p-ethylphenyl)-1-desoxy-riburonic acid,
the sodium salt of 1-p-ethylphenyl-1-desoxy-taluronic acid,
the sodium salt of 1,1-di-(p-ethylphenyl)-1-desoxy-taluronic acid,
the sodium salt of 1-p-ethylphenyl-1-desoxy-galacturonic acid,
the sodium salt of 1,1-di-(p-ethylphenyl)-1-desoxy-galacturonic acid,
the sodium salt of 1-p-ethylphenyl-1-desoxy-iduronic acid,
the sodium salt of 1,1-di-(p-ethylphenyl)-1-desoxy-iduronic acid,
the sodium salt of 1-p-ethylphenyl-1-desoxy-guluronic acid,
the sodium salt of 1,1-di-(p-ethylphenyl)-1-desoxy-guluronic acid,
the sodium salt of 1-p-ethylphenyl-1-desoxy-mannuronic acid,
the sodium salt of 1,1-di-(p-ethylphenyl)-1-desoxy-mannuronic acid,
the sodium salt of 1-p-ethylphenyl-1-desoxy-glucuronic acid,
the sodium salt of 1,1-di-(p-ethylphenyl)-1-desoxy-glucuronic acid,
the sodium salt of 1-p-ethylphenyl-1-desoxy-altruronic acid,
the sodium salt of 1,1-di-(p-ethylphenyl)-1-desoxy-altruronic acid,
the sodium salt of 1-p-ethylphenyl-1-desoxy-alluronic acid, and
the sodium salt of 1,1-di-(p-ethylphenyl)-1-desoxy-alluronic acid.

Friedel-Crafts metal halide catalysts which are employed in this process are used in substantially anhydrous form or modified by means of an alcohol, an ether, an ester, a nitroparaffin, etc. to give a catalyst of controlled activity, if so desired. A Friedel-Crafts metal halide catalyst which is preferred for use in this process is substantially anhydrous aluminum chloride. Other Friedel-Crafts metal halides which may be utilized as catalysts in this process, but not necessarily with equivalent results, are aluminum bromide, ferric chloride, ferric bromide, zinc chloride, beryllium chloride, gallium chloride, titanium tetrachloride, zirconium chloride, stannic chloride, etc.

The process may be carried out by slowly adding a Friedel-Crafts metal halide catalyst such as aluminum chloride to a stirred mixture of an aromatic hydrocarbon and sugar acid lactone while maintaining the reaction temperature at from about −20° C. to about 150° C. and preferably at from about 20° C. to about 100° C. After the reaction mixture has reached the desired degree of reaction or completion, the entire reaction mixture and catalyst may be mixed with water or may be added to ice in order to quench the activity of the catalyst and to permit separation of the organic reaction product and unreacted starting materials.

The nature of this invention is illustrated further by the following example, which, however, should not be construed to limit unduly the generally broad scope of the invention.

EXAMPLE I

In a one-liter alkylation flask with a mercury sealed stirrer and reflux condenser, the following were contacted 4 hours at 70–80° C.:

| | |
|---|---|
| Glucuronolactone _____grams__ | 25 |
| AlCl$_3$ _____do____ | 93 |
| Benzene _____cc____ | 300 |

During the contacting, 29 grams of HCl was evolved. The flask contents was decomposed with ice and the following recovery noted exclusive of unreacted benzene:

| | Grams |
|---|---|
| Hydrocarbon soluble oil_____ | 4.2 |
| Water washed, cold water insoluble solid (A)_____ | 54 |

Segment (A) was boiled with caustic solution, the insoluble part filtered off; the filtrate acidified, throwing down precipitate (B); the filtrate from (B) was ether extracted to give solid (C).

Pure compounds isolated (1)                        $C_{18}H_{18}O_5$

Segment (B) contained 12 grams of a component, (1), insoluble in cold water and crystallizing from hot water in needles forming star clusters. Dried on a filter paper, these crystals showed a slight yellow sheen, and melted at 178–180° C. These crystals dissolved immediately in NaOH solution but in concentrated solution separated immediately as a sodium salt in the form of short needles melting at 205–210° C. with decomposition. The sodium salt dissolved when diluted with water; when this solution was acidified, no immediate precipitation occurred, but in 2 to 3 days, needles came out melting at 179–180° C., identical to the original. The compound burned with difficulty and difficulty was observed in carbon and hydrogen analysis in obtaining complete combustion.

Elementary analysis of (1)

| | Percent C | Percent H |
|---|---|---|
| Found_____ | 68.00 | 5.95 |
| | 68.21 | 5.93 |
| Calc. for C$_{18}$H$_{18}$O$_5$_____ | 68.78 | 5.77 |

Thus, elementary analysis and chemical behavior of product (1) are in accord with 1,1-diphenyl-1-desoxy-glucuronolactone:

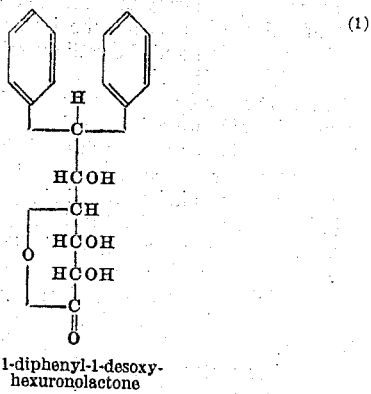

1,1-diphenyl-1-desoxy-hexuronolactone

Glucuronolactone does not exist as the free acid, and the lactone structure apparently went through the reaction and subsequent water recrystallizations unchanged.

(2)                    $C_{18}H_{20}O_6$

Segment (C) crystallized from ether to crystals, designated (2), of melting point 138–139° C. This product had a fatty acid odor and gave a foamy solution in water. Like compound (1), it burned with difficulty.

Analysis

| | Percent C | Percent H |
|---|---|---|
| Found for (2)_____ | 64.25 | 6.01 |
| Calc. for C$_{18}$H$_{20}$O$_6$_____ | 65.05 | 6.06 |

The yield of compound (2) could not be evaluated from the data available; its yield, however, was substantially less than that of (1). On the basis of analysis, chemical behavior, and fatty acid odor, (2) corresponds to the free acid of which (1) is the lactone.

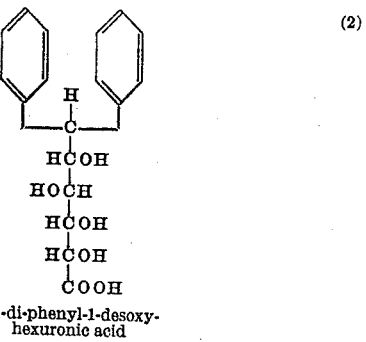

1,1-di-phenyl-1-desoxy-hexuronic acid

EXAMPLE II

The sodium salt of compound 1, as described in Example I, was prepared by reaction of 1,1-di-phenyl-1-desoxyglucuronolactone with an ethanolic solution of sodium hydroxide. The sodium salt is a solid and was recovered by filtration. This sodium salt was tested as a corrosion inhibitor in 300 cc. of a 5% sodium chloride solution. The concentration of this sodium salt of 1,1-di-phenyl-1-desoxy-glucuronic acid utilized was 0.05 weight percent in the sodium chloride solution.

The corrosion inhibitor was evaluated by adding the 300 cc. of 5% sodium chloride solution containing 0.05% of the inhibitor into a 600 cc. beaker which was stirred at 250 r.p.m. and air bubbled therethrough at a rate of 5.6 liters per hour. On the bottom of the beaker in contact with the brine solution was a mild steel strip one end of which was elevated by a glass rod. Stirring and air introduction was continued for 6 hours time. At the same time a duplicate experiment was carried out with no added corrosion inhibitor in the brine solution. The iron strip in the blank or control experiment lost 22 milligrams in weight during the run in comparison to a weight loss of 7.5 milligrams for the iron strip in contact with the brine solution and the sodium salt of 1,1-di-phenyl-1-desoxy-glucuronic acid.

These experiments show that 1,1-di-phenyl-1-desoxy-glucuronic acid in the form of its sodium salt is equivalent to or slightly better than sodium nitrite, a well known corrosion inhibitor. The addition of the same concentration of sodium nitrite to a brine solution results in a weight loss of 8 milligrams in a comparable corrosion test. Water soluble corrosion inhibitors for brine solutions are particularly important for use by railroads since brine which drips from refrigerator cars causes serious corrosion of railroad tracks. Also, water soluble corrosion inhibitors are important in other diverse uses such as in boiler water, etc.

I claim as my invention:

1. A compound selected from the group consisting of aryl-1-desoxy alduronolactone, aryl-1-desoxy alduronic acid, and a sodium salt of aryl-1-desoxy-alduronic acid.
2. Phenyl-1-desoxy-alduronolactone.
3. Phenyl-1-desoxy-hexuronolactone.
4. 1-phenyl-1-desoxy-glucuronolactone.
5. 1,1-di-phenyl-1-desoxy-glucuronolactone.
6. Phenyl-1-desoxy-alduronic acid.
7. Phenyl-1-desoxy-hexuronic acid.
8. 1-phenyl-1-desoxy-glucuronic acid.
9. 1,1-di-phenyl-1-desoxy-glucuronic acid.
10. The sodium salt of phenyl-1-desoxy-alduronic acid.
11. The sodium salt of phenyl-1-desoxy-hexuronic acid.
12. The sodium salt of 1-phenyl-1-desoxy-glucuronic acid.
13. The sodium salt of 1,1-di-phenyl-1-desoxyglucuronic acid.

References Cited in the file of this patent

UNITED STATES PATENTS

| | | |
|---|---|---|
| 2,472,276 | Bonner | June 7, 1949 |
| 2,798,098 | Linn | July 2, 1957 |
| 2,798,100 | Linn | July 2, 1957 |